No. 679,092.  
C. P. STEINMETZ.  
SYSTEM OF ELECTRICAL DISTRIBUTION.  
(Application filed Jan. 2, 1901.)  
Patented July 23, 1901.

(No Model.)  
2 Sheets—Sheet 1.

Witnesses.  
John Ellis Glenn  
Benjamin B Hull

Inventor.  
Charles P. Steinmetz,  
by Albert G. Davis  
Atty.

No. 679,092.

C. P. STEINMETZ.
SYSTEM OF ELECTRICAL DISTRIBUTION.
(Application filed Jan. 2, 1901.)

(No Model.)

Patented July 23, 1901.

2 Sheets—Sheet 2.

Witnesses.
John Ellis Glenn
Benjamin B. Hull

Inventor:
Charles P. Steinmetz
by Albert G. Davis
Atty.

UNITED STATES PATENT OFFICE.

CHARLES P. STEINMETZ, OF SCHENECTADY, NEW YORK, ASSIGNOR TO GENERAL ELECTRIC COMPANY, OF NEW YORK.

SYSTEM OF ELECTRICAL DISTRIBUTION.

SPECIFICATION forming part of Letters Patent No. 679,092, dated July 23, 1901.

Application filed January 2, 1901. Serial No. 41,809. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (Case No. 1,996,) of which the following is a specification.

In constant-potential constant-current-transforming devices in which the desired transformation is effected through suitable combinations of reactances of opposite sign I have found that the insertion of an electromotive force of any phase or value in the constant-current circuit does not impair the constant-current regulation. This fact I take advantage of to greatly increase the range of regulation of such a system, and I accomplish this result by inserting a separately-derived electromotive force of constant potential in series with the constant-current circuit of a transforming system of the type mentioned. I find that the maximum effect is obtained when the two electromotive forces are in line. Since the constant-current electromotive force appears in quadrature with the constant-potential electromotive force of the system, I derive from the constant-potential circuit an electromotive force shifted ninety degrees therefrom, which electromotive force is therefore in phase with the impressed electromotive force of the constant-current system. The constant electromotive force thus derived I insert in circuit in the constant-current system. By this means I practically double the range of regulation of the constant-current system and at the same time render the regulation less sensitive to any higher harmonics which may appear in the electromotive force acting in the constant-potential circuit.

For a definite statement of the features of novelty of the invention reference is to be had to claims appended hereto.

The invention itself will be better understood and its advantages more readily apparent by reference to the following description, taken in connection with the accompanying drawings, in which—

Figure 1:
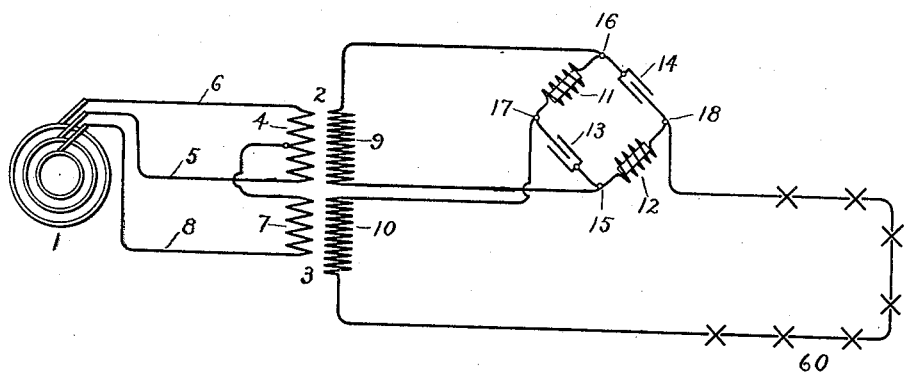
Figure 3:
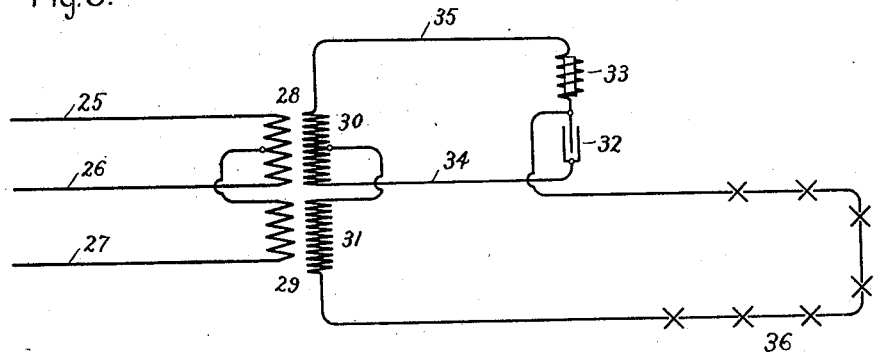
Figure 4:
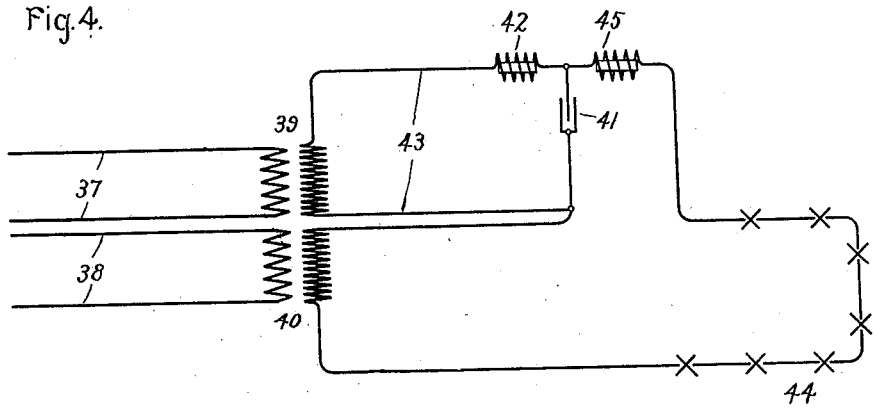

Figure 1 represents a three-phase constant-potential system operatively connected to a constant-current consumption-circuit through a transforming apparatus arranged in accordance with my invention. The arrangement shown in Fig. 2 differs from that in Fig. 1 in that a quarter-phase source of supply is used instead of a three-phase source. Figs. 3 and 4 are distinguished from Figs. 1 and 2 in that they represent combinations of reactances for effecting transformation from constant potential to constant current, these combinations of reactances being different from the combination shown in Figs. 1 and 2.

The general idea of the invention being to supply to the constant-current circuit an electromotive force in quadrature, with the constant-potential electromotive force impressed upon the transforming system, I find it therefore convenient to employ a polyphase source of constant electromotive force, since from such a source I may readily derive an electromotive force having a phase value suitable for insertion in the constant-current circuit. In Fig. 1, in which I represent a three-phase source of supply conventionally at 1, I obtain the desired quadrature electromotive force through the employment of phase-changing transformers 2 and 3, which in this instance happen to be of the step-up variety. The primary 4 of the transformer 2 is connected directly across the mains 5 and 6 of the three-phase source. The primary 7 of the transformer 3 is connected with one terminal to the remaining main 8 of the three-phase system and with its other terminal to the middle point in the other primary 4. The result of this mode of connection is, as is well known, the production of quarter-phase electromotive forces in corresponding secondaries. (Indicated at 9 and 10.) One of these secondaries—as, for example, the secondary 9—is employed to supply constant-potential current to the constant-potential constant-current transforming device, consisting in the instance shown of a quadrilateral connection of reactances of opposite sign, the reactances of one sign being arranged alternately with those of the other. By reference to Fig. 1 this arrangement of reactances will be seen to consist of the inductance-coils 11 and 12 and the condensers 13 and 14, all of which are included in closed circuit, the inductance-coils alternating with the condensers. Across one diagonal of this aforesaid quadrilateral circuit I connect the supply-circuit 9, the points of connection being indicated at 15 and 16.

The constant-current circuit 60 is connected with its terminals across the remaining diameter, the points of connection being indicated at 17 and 18. This arrangement of reactances causes a constant current to flow in the circuit 60, provided a constant electromotive force is impressed on the constant-potential circuit corresponding to the secondary 9. The electromotive force thus impressed upon the constant-current circuit is in quadrature with that supplied by the secondary 9. The electromotive force supplied by the secondary 10, which is connected in series in the constant-current circuit 60, as shown, is therefore in phase with the variable constant-current electromotive force.

At no load, as when all the translating devices have been cut out of constant-current circuit, the electromotive force of the secondary 10 is in opposition to, but practically balanced by, the constant-current electromotive force developed between the terminals 17 and 18 of the transforming device. With increasing load on the constant-current circuit the electromotive force between the terminals 17 and 18 gradually decreases and, with increasing load, passes through zero and increasing in the opposite direction thereby becomes additive to the electromotive force of the secondary 10. At full load the total electromotive force is the sum of the variable electromotive force between the terminals 17 and 18 and the constant electromotive force derived from the quarter-phase secondary 10. The range of regulation of the apparatus is thereby practically doubled, which is obviously a very valuable feature.

The presence of a large constant electromotive force in the constant-current circuit has the additional advantage that it renders negligible the tendency of harmonics in the impressed electromotive force wave to impair the regulation of the transforming apparatus at light loads. The constant-current regulation, in addition to being extended in its range, is thereby rendered more perfect throughout the range, the current not increasing at small loads, as would otherwise be the case due to magnified harmonics were the constant electromotive force not impressed upon the constant-current circuit.

Figure 2:
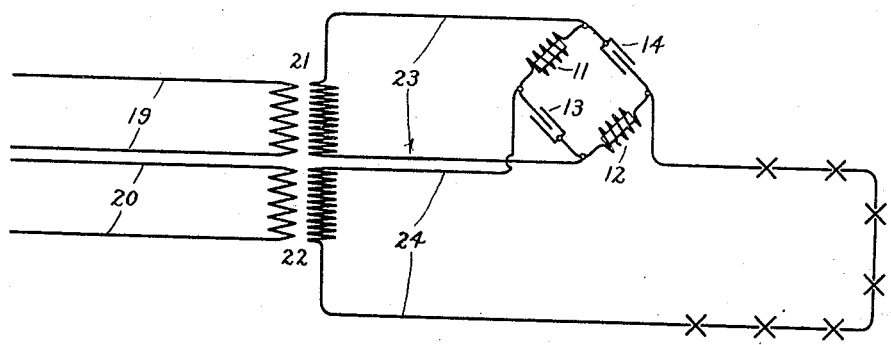

Fig. 2 differs only from the arrangement shown in Fig. 1 in that the multiphase system chosen as a source of supply is quarter-phase instead of three-phase. This renders unnecessary the use of phase-changing transformers. The quarter-phase mains 19 and 20 therefore transform directly through step-up or step-down transformers 21 22 into the secondary circuits indicated at 23 and 24, the circuit 24 corresponding to the constant-current circuit 60 in Fig. 1 and the circuit 23 to the constant-potential circuit-feeding current into the combination of reactances 11 to 14, inclusive.

Fig. 3 shows an arrangement in which three-phase current is supplied over the mains 25, 26, and 27 to a set of phase-changing transformers 28 and 29 of the same character as the transformers 2 and 3 in Fig. 1. The secondary 30 of one of these transformers is connected across the terminals of a circuit including a condenser 32 in series with an inductance-coil 33. The constant-current circuit is derived from a connection between the junction of these two reactances and the middle point in the length of the secondary 30. Since, as has heretofore been set forth, the electromotive force across the terminals of either the condenser 32 or the inductance-coil 33 is at right angles to that between the terminals of the constant-potential supply-conductors 34 and 35, provided these reactances are in resonance relation to each other, the constant-current circuit may be connected as shown without having its regulation affected by the electromotive force in the secondary 30.

The constant-current circuit (indicated in in Fig. 3 at 36) has included therein, similarly to Figs. 1 and 2, a source of electromotive force in quadrature relation to that impressed upon the constant-potential constant-current transforming device, this result being secured in the present instance by the inclusion of the secondary 31 in series with the circuit 36. The same beneficial results flow from this connection as were described in connection with the previous figures of the drawings, the difference being in the specific arrangement of the constant-current constant-potential transforming device.

Fig. 4 shows a still different system, in which, as in Fig. 2, a quarter-phase source of supply is indicated by the supply-mains 37 and 38, to which are connected transformers 39 and 40, one of which supplies a constant-potential electromotive force to the constant-potential constant-current transforming device, the other supplying a quadrature electromotive force in series with the constant-current circuit. In this instance the transforming device consists of a condenser 41, in series with an inductance-coil 42 across the constant-potential conductors 43, supplied by the secondary of the transformer 39. The constant-current circuit 44 includes in series therewith another inductance-coil 45 and is connected across the terminals of the condenser 41. This constant-current circuit is, however, in series with the secondary winding of the transformer 40, this secondary furnishing a quadrature electromotive force in phase with that impressed on the constant-current circuit. The condenser 41 and the inductance-coils 42 and 45 are all of the same reactance. With this proportioning of parts a constant current is maintained in the constant circuit and the power factor of the constant-potential supply-circuit practically unaffected by the reactances mentioned. The effect of the series inductance-coil 45 is upon an increase in load on the constant-current circuit to cause a gradual advance in phase of the resultant of the currents in the two branches consisting of the condenser 41 and the constant-current circuit 44. This gradual advance in phase compensates for the wattless current in the constant-potential circuit 43.

In the specific embodiments of my invention above described I have represented energy at constant potential being transformed into energy in the form of constant current; but it will of course be evident that the reverse transformation may be effected—that is, energy in the form of constant current being transformed into current at constant potential.

Wherever herein I speak of "reactances of opposite sign" I mean to include devices which possess capacity and inductance, respectively. For the purpose of illustration I have shown a condenser as typifying a device possessing capacity and an inductance-coil as typifying a device possessing inductance; but it will be evident to those skilled in the art that other devices possessing these same qualities may be employed—such, for example, as polarization-cells, transformers with open magnetic circuits, transformers with condensers in their secondaries, &c.

What I claim as new, and desire to secure by Letters Patent of the United States, is—

1. The combination of a source of constant-potential current, means in operative relation to said source for deriving therefrom a constant current, and additional means for combining with the electromotive force producing said constant current another electromotive force substantially in phase therewith.

2. The combination of a source of electromotive force, a consumption-circuit, means for impressing upon the consumption-circuit a variable electromotive force derived from and in quadrature to said source, and means for including in the consumption-circuit an electromotive force substantially in phase with the electromotive force impressed thereon.

3. The combination of sources of phase-displaced electromotive forces, a set of reactances of opposite sign connected in series across one of said sources, another set of reactances of opposite sign also connected in series across said source but in reverse relation to the first set, a constant-current circuit connected between the junctions of the reactances of said sets and connections including another of said sources of electromotive force in series in said constant circuit.

4. The combination of a source of electromotive force, a consumption-circuit, means for impressing on the consumption-circuit a variable electromotive force derived from and in quadrature with the electromotive force of said source, and for including in the consumption-circuit an electromotive force out of phase with the electromotive force of said source.

5. The combination of a source of electromotive force, a consumption-circuit, means for impressing on the consumption-circuit an electromotive force derived from and in quadrature with the electromotive force of said source, and means for including in the consumption-circuit an electromotive force out of phase with the electromotive force of said source.

6. The combination of a source of multiphase current, means in operative relation to one phase of said source for producing a constant current, and means for augmenting the power of the constant current by an electromotive force derived from another phase of said source.

7. The combination of a source of multiphase current, a constant-current circuit operatively connected to one phase of said source, and means for including in said constant-current circuit an electromotive force derived from another phase of said source.

8. The combination of a source of multiphase current, means for deriving a constant current from one phase of said source, and means for impressing upon the constant-current circuit a constant electromotive force derived from another phase of said source.

9. The combination of windings constituting seats of phase-displaced electromotive forces, a constant-current circuit connected across one of said windings through the medium of a constant-current regulating apparatus, and connections including another of said windings in series in said constant-current circuit.

10. The combination of separate sources of electromotive force, means for deriving from one of said sources a constant-current electromotive force in quadrature therewith, and means for combining with the constant-current electromotive force another electromotive force of substantially the same phase.

In witness whereof I have hereunto set my hand this 29th day of December, 1900.

CHARLES P. STEINMETZ.

Witnesses:
BENJAMIN B. HULL,
EDWARD WILLIAMS, Jr.